(12) United States Patent
Woods

(10) Patent No.: US 12,422,299 B2
(45) Date of Patent: Sep. 23, 2025

(54) OPEN CHANNEL FLOW MONITORING APPARATUS

(71) Applicant: DETECTRONIC LIMITED, Nelson (GB)

(72) Inventor: Stephen Woods, Colne (GB)

(73) Assignee: DETECTRONIC LIMITED, Nelson (GB)

( * ) Notice: Subject to any disclaimer, the term of this patent is extended or adjusted under 35 U.S.C. 154(b) by 280 days.

(21) Appl. No.: 17/794,689

(22) PCT Filed: Jan. 18, 2021

(86) PCT No.: PCT/GB2021/050106
§ 371 (c)(1),
(2) Date: Jul. 22, 2022

(87) PCT Pub. No.: WO2021/148778
PCT Pub. Date: Jul. 29, 2021

(65) Prior Publication Data
US 2023/0044547 A1 Feb. 9, 2023

(30) Foreign Application Priority Data

Jan. 23, 2020 (GB) .................................. 2000998

(51) Int. Cl.
*G01F 25/20* (2022.01)
*G01F 23/14* (2006.01)
(Continued)

(52) U.S. Cl.
CPC .............. *G01F 25/20* (2022.01); *G01F 23/14* (2013.01); *G01F 23/18* (2013.01); *G01F 23/296* (2013.01); *G01F 23/2962* (2013.01)

(58) Field of Classification Search
CPC ...... G01F 25/20; G01F 23/18; G01F 23/2962; G01F 23/14; G01F 23/296
(Continued)

(56) References Cited

U.S. PATENT DOCUMENTS 5,184,510 A * 2/1993 Rossman .............. G01F 23/296
 73/1.73
5,633,809 A 5/1997 Wissenbach et al.
(Continued)

FOREIGN PATENT DOCUMENTS

AU  2014274657 A1 * 7/2015 ........... G01F 23/296
CA     2465743 C  *  7/2008 ............. E21B 47/01
(Continued)

OTHER PUBLICATIONS

Translate CN_110530456 (Year: 2019).*
(Continued)

*Primary Examiner* — Peter J Macchiarolo
*Assistant Examiner* — Monica S Young
(74) *Attorney, Agent, or Firm* — Nixon & Vanderhye P.C.

(57) ABSTRACT

An open channel flow monitoring apparatus for measuring a fluid level is disclosed having a first sensor configured to obtain data indicative of a fluid level below a first threshold level, a second sensor configured to obtain data indicative of fluid level above a second threshold level, which is lower than the first threshold level, and both the first sensor and the second sensor are configured to obtain data indicative of the fluid level when the fluid level is between the first threshold level and the second threshold.

13 Claims, 6 Drawing Sheets

(51) Int. Cl.
*G01F 23/18* (2006.01)
*G01F 23/296* (2022.01)
*G01F 23/2962* (2022.01)

(58) Field of Classification Search
USPC .......................................................... 73/1.73
See application file for complete search history.

(56) References Cited

U.S. PATENT DOCUMENTS

| | | | |
|---|---|---|---|
| 6,606,279 B1 | 8/2003 | Preston | |
| 2002/0153885 A1* | 10/2002 | Blossfeld | G08C 19/22 324/252 |
| 2011/0216626 A1* | 9/2011 | Stacey | H04R 1/44 367/131 |

FOREIGN PATENT DOCUMENTS

| | | | | |
|---|---|---|---|---|
| CN | 203949779 U | * | 11/2014 | |
| CN | 104316140 | | 1/2015 | |
| CN | 205301889 U | * | 6/2016 | |
| CN | 110530456 | * | 10/2019 | |
| DE | 20 2017 106 083 | | 1/2019 | |
| DE | 202017106083 U1 | * | 2/2019 | ............. G01F 23/00 |
| FR | 2922625 A1 | * | 4/2009 | ............... E03B 7/02 |
| JP | 3201140 | | 11/2015 | |
| JP | 3201140 U | * | 11/2015 | |
| KR | 102037873 | * | 6/2018 | |
| WO | WO-2016028526 A1 | * | 2/2016 | ......... G01F 23/0076 |
| WO | WO-2019067765 A1 | * | 4/2019 | ............. E21B 17/01 |

OTHER PUBLICATIONS

Translate KR102037873 (Year: 2018).*
NZ Patent Examination Report for Application No. 791436 dated Jan. 31, 2024, eight pages.
International Search Report for PCT/GB2021/050106 dated Apr. 9, 2021, 4 pages.
Written Opinion of the ISA for PCT/GB2021/050106 dated Apr. 9, 2021, 6 pages.

* cited by examiner

OPEN CHANNEL FLOW MONITORING APPARATUS

CROSS REFERENCE TO RELATED APPLICATIONS

The present application is a National Phase of International Application Number PCT/GB2021/050106 filed Jan. 18, 2021, which designated the U.S. and claims priority benefits from Great Britain Patent Application Number GB2000998.1, filed Jan. 23, 2020, the entire contents of each of which are hereby incorporated by reference.

The present disclosure relates to an open channel flow monitoring apparatus for measuring a fluid level and a method of measuring a fluid level in an open channel system.

BACKGROUND

Fluid levels in an open-channel, such a sewer or stormwater drainage network, will change depending on various factors, such as the level of rainfall and the operational capacity of the system.

In normal conditions, fluid levels, such as water/sewage levels, are usually located below a first threshold level. However, certain circumstances, such as during heavy rainfall or when a blockage occurs, may result in the fluid level rising to an abnormal level.

If the sewage level rises too high, then sewage or storm water may be directed to overflow run-off paths to ensure that there is not an unmanageable volume of sewage flowing forward to the treatment process ensuring that the system will continue to work effectively. As such, it is important to monitor the operational levels in a drainage network of sewers such that the flow of the fluid can be understood and if necessary, controlled.

It is known to provide an ultrasonic distance measuring sensor to determine sewage or water levels within a drainage network. However, ultrasonic sensors measuring distance in air to determine the fluid level will become ineffective as they become submerged. Therefore, typically these ultrasonic sensors are mounted as far away from the fluid level as possible. However, mounting ultrasonic sensors as far away from the fluid level as possible doesn't completely eliminate the submersion risk. In addition, the longer operating range introduces degradation of both accuracy and resolution of measured fluid level data.

It is an aim of the present invention to measure and deliver accurate and reliable fluid level data within a network of sewers or other open-channel flow applications across a wide range of operating conditions.

SUMMARY

According to the present disclosure there is provided an open channel flow monitoring apparatus for measuring a fluid level as set forth in the appended claims. Other features of the invention will be apparent from the dependent claims, and the description which follows.

According to a first example, there is provided an open channel flow monitoring apparatus for measuring a fluid level, the apparatus comprising: a first sensor configured to obtain data indicative of a fluid level below a first threshold level; a second sensor configured to obtain data indicative of fluid level above a second threshold level, which is lower than the first threshold level; wherein both the first sensor and the second sensor are configured to obtain data indicative of the fluid level when the fluid level is between the first threshold level and the second threshold. The apparatus includes a housing comprising a skirt portion that defines a recess within the housing, wherein the first sensor is substantially located within a recess defined by the skirt portion.

The provision of the recess defined by the skirt portion means that the first sensor is less likely to become submerged in the fluid as the fluid level rises, thereby reducing the requirements for cleaning and maintenance.

The provision of a first sensor and a second sensor which have an overlapping range in which they are both configured to obtain data indicative of a fluid level means that the apparatus is effective during both normal conditions and abnormal conditions of fluid levels. That is to say that there is no "dead-band" where neither of the sensors are able to measure the fluid level.

In one example, the apparatus is configured to calibrate the data indicative of fluid level obtained by the second sensor based on the data obtained by the first sensor indicative of the fluid level. As such, the apparatus is able to deliver a single, continuous level data set the derivation of which transitions seamlessly from the data obtained by the first sensor to the data obtained by the pressure sensor.

In one example, the apparatus is configured to calibrate the data indicative of fluid level obtained by the second sensor using the data indicative of the last stored fluid value obtained by the first sensor as the fluid level rises above the second threshold.

In one example, the apparatus is configured to use an algorithm to calibrate the data indicative of fluid level obtained by the second sensor.

The apparatus is simple to install and ultra-low maintenance by design as it requires no physical external atmospheric breather for the second sensor.

The first sensor may be an ultrasonic sensor. The second sensor may be a pressure sensor. Due to the overlap of monitoring ranges of the first sensor and the second sensor and the fact that the second sensor may be calibrated based on the data obtained by the first sensor, a reference to atmospheric pressure by the pressure sensor is not required. This significantly reduces the complexity of the apparatus.

In one example, the pressure sensor comprises a pressure probe configured to project to the second threshold level.

The apparatus may comprise a temperature sensor. The local temperature may affect the speed of the sonic velocity of the ultrasonic waves. Therefore, the apparatus may use the local temperature to calibrate the ultrasonic sensor to account for the local temperature.

In one example, the first sensor and the second sensor are configured to output data indicative of the sewage level on a single data line, wherein the output data transitions seamlessly from data obtained from the first sensor to data obtained from the second sensor.

This significantly simplifies the apparatus as only a single line of data is required.

In one example, the apparatus includes a data logger configured to log the obtained data indicative of the fluid level.

In one example, the apparatus includes a transmitter configured to transmit the obtained the obtained data indicative of the fluid level.

The open channel flow may be a sewer and the fluid level may be a sewage level.

According to one example, there is provided a method of measuring a fluid level in an open-channel system, the method comprising: obtaining, at a first sensor, data indicative of the fluid level below a second threshold level, which is lower than the first threshold level; obtaining, at both the first sensor and a second sensor, data indicative of fluid level between the first threshold level and the second threshold level; and obtaining, at the second sensor, data indicative of fluid level above the first threshold level.

The method may include the step of calibrating the data indicative of the fluid level obtained by the second sensor based on the data obtained by the first sensor indicative of the fluid level.

According to one example, there is provided a computer-readable storage medium comprising instructions, which when executed by a computer, cause the computer to carry out the method of measuring a fluid level in an open-channel system identified above.

According to one example, there is provided a computer program product comprising instructions, which when the program is executed by a computer, cause the computer to carry out the method of measuring a fluid level in an open-channel system identified above.

All of the features contained herein may be combined with any of the above aspects and in any combination.

BRIEF DESCRIPTION OF THE DRAWINGS

Examples of the present disclosure will now be described with reference to the accompanying drawings.

DETAILED DESCRIPTION

The present disclosure relates to an open-channel flow monitoring apparatus for measuring a fluid level. In particular, the open-channel flow monitoring apparatus may be a sewage level monitoring apparatus for measuring the sewage level.

The apparatus includes two sensors, which in one example are different technology types.

The first sensor is configured to measure the fluid level between a first range of fluid levels. The second sensor is configured to measure the fluid level between a second range of fluid levels. The first range of fluid levels and the second range of fluid levels overlap. That is to say that there is an overlapping range of fluid levels where both the first sensor and the second sensor are both configured to measure the fluid level. The overlapping range means that the apparatus is able to effectively "hand-over" responsibility from the first sensor to the second sensor before the fluid level moves out of the first range of fluid levels. Providing this overlapping range means that the apparatus is able to monitor the fluid level throughout all of the conditions of the fluid levels. In one example, the fluid is a liquid. For example, the fluid may comprise sewage or storm-water.

The obtained data from the first sensor may be used to effectively calibrate the data from the second sensor in the overlapping range, thereby eliminating the requirement for separate reference conditions for the second sensor.

Figure 1:
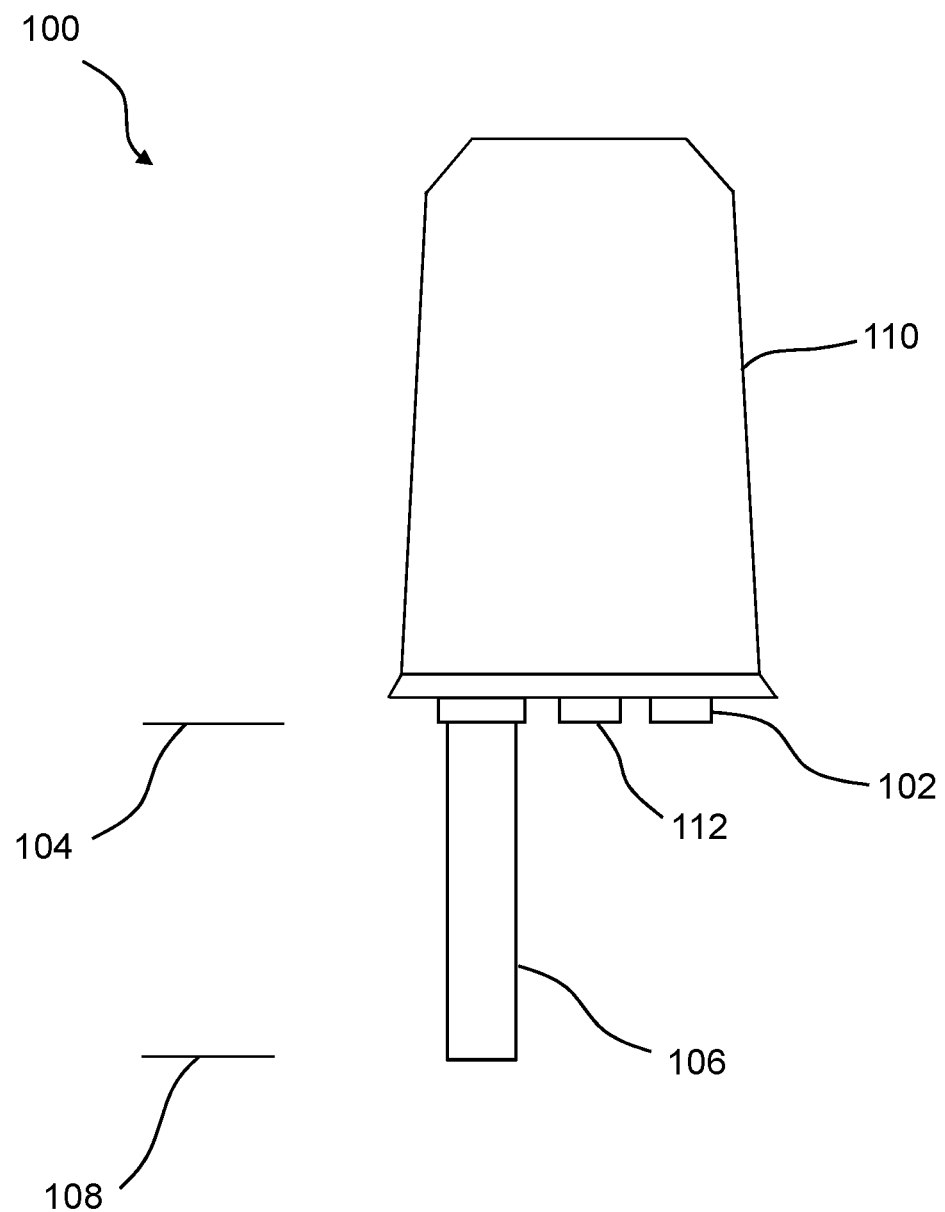
FIG. 1 shows an example of a front elevation of an open-channel flow monitoring apparatus.

FIG. 1 shows an example of an open channel flow monitoring apparatus 100. The apparatus 100 includes a first sensor 102 configured to obtain data indicative of a fluid level below a first threshold level 104. The first threshold level 104 may be level with an underside of the first sensor 102. In other words, the first sensor 102 may be able to monitor the level of the fluid in an open channel when the fluid level is below the first sensor 102.

The apparatus 100 also includes a second sensor 106 configured to obtain data indicative of fluid level in an open-channel above a second threshold level 108, which is lower than the first threshold level 106. In one example, the second threshold level 108 is level with the underside of the second sensor 106.

In normal conditions, the fluid level in the open channel is below the second threshold 108. As such, in normal conditions, only the first sensor 102 is used to obtain data relating to the fluid level. If the fluid level rises, for example due to rainfall, then the fluid level may raise above the second threshold level 108.

As the fluid level rises above the second threshold level 108, then the second sensor 106 will begin to monitor the fluid level, by obtaining data relating to the level of the fluid. As such, between the first threshold and the second threshold, each of the first sensor 102 and the second sensor 106 are configured to obtain data relating to the fluid level.

If the fluid level rises above the first threshold level 104, then the first sensor 102 will no longer be able to obtain data relating to the fluid level and the second sensor 106 will monitor the fluid level by obtaining data relating to the level of the fluid.

As such, in both normal conditions and extreme conditions, the apparatus 100 is able to monitor the fluid level.

In one example, the first sensor 102 comprises an ultrasonic distance measurement sensor. The ultrasonic sensor comprises a transducer to transmit an ultrasonic sound wave. The sound wave is reflected from the surface of the fluid level and received by the transducer. The ultrasonic sensor is able to determine the fluid level based on the time delay between the transmission and reception of the sound wave.

The first sensor 102 in the form of the ultrasonic sensor may be used to accurately determine the fluid level during a wide range of "normal" operating conditions, in other words, the ultrasonic sensor may be used to determine the fluid level when the fluid in the open-channel is operating as expected. In one example, the ultrasonic sensor has a measuring range of between approximately 0 to 2 m. The ultrasonic sensor will reliably detect subtle changes in fluid level, accurately delivering, for example, small silt-induced variations in the fluid level. In this example, the data indicative of the fluid level obtained by the first sensor 102 may comprise a timing measurement, which represents the time between the transmission of the sound wave and reception of the reflected sound wave by the transducer. In this example, the timing measurement is indicative of the fluid level. The data indicative of the fluid level obtained by the first sensor 102 may comprises a distance measurement from the first sensor 102 to the fluid level. In this example, the distance measurement is indicative of the fluid level.

In one example, the second sensor 106 comprises a pressure sensor. As part of the second sensor 106 becomes submerged, then the pressure level will rise and so the pressure sensor is able to determine the fluid level. As such, the pressure sensor will be able to determine the fluid level based on the rise in pressure. In one example, the pressure sensor comprises a pressure probe, such as a cannulated portion, that extends below the first sensor 102. In this example, the pressure sensor will begin to obtain data relating to the fluid level when the fluid level rises above the bottom of the pressure probe. The pressure sensor may operate with a range of between approximately +3.50 or +10.00 mH2O. The pressure sensor may be configured to deal with exceptional fluid levels during high level events when the apparatus 100 is at least partially submerged. The pressure sensor begins to measure the fluid level before the first sensor stops measuring. In other words, there is a period of overlap when both the ultrasonic sensor and the pressure sensor are each configured to obtain data relating to the fluid level. In this example, the data indicative of the fluid level obtained by the second sensor 106 may comprises a pressure value or a change in pressure value.

As disclosed above, the data obtained by the first sensor 102 can be used to calibrate the second sensor 106. In the example in which the second sensor 106 comprises a pressure sensor, the pressure sensor does not require an atmospheric value to establish the zero reference for the pressure sensor as it is activated and so eliminates the need for physical reference to atmospheric pressure. The removal of this requirement simplifies installation and reduces the required maintenance of the apparatus 100.

The apparatus comprising a first sensor 102 in the form of an ultrasonic sensor and a second sensor 106 in the form of a pressure sensor provides single fluid level data channel with seamless and transparent transition from fluid level measurement using the ultrasonic sensor to fluid level depth measurement using the pressure sensor. This means that the monitoring/logging device simply receives an accurate fluid level measurement from the apparatus 100 irrespective of which sensor is in operation.

In one example, the apparatus 100 comprises a third sensor 112. The third sensor 112 may measure another characteristic, such as a local condition, that may influence the readings from one or more of the first sensor 102 and the second sensor 104. In one example, the third sensor 112 comprises a temperature sensor configured to measure the local temperature. In the example in which the first sensor 102 comprises an ultrasonic sensor, the local temperature may affect the speed of the sonic velocity of the ultrasonic waves. Therefore, the apparatus 100 may use the local temperature to calibrate the ultrasonic sensor to account for the local temperature.

The apparatus 100 may be configured to calibrate the data indicative of fluid level obtained by the second sensor 106 based on the data obtained by the first sensor 102 indicative of the fluid level.

The calibration is possible because the apparatus has a hand-over region where both the first sensor 102 and the second sensor 106 are configured to obtain data relating to the fluid level. In this region the data from the first sensor 102 can be used to calibrate the data from the second sensor 106. In other words, when the fluid level rises to be above the second threshold level 108 and the second sensor 106 begins to obtain data, then the data obtained by the first sensor 102 is used to calibrate the data of the second sensor 106.

As such, the data from the first sensor 106 can be used to set the reference level of the data from the second sensor 108. For example, if the second sensor 106 comprises a pressure sensor, then the initial data can be set to match the data from the first sensor 102, thereby eliminating the requirement for a reference to atmospheric pressure, which can be complicated and costly.

In one example, the apparatus 100 comprises a microprocessor configured to run an algorithm which processes the last measured fluid value to establish the zero reference for the pressure sensor as it is activated and so eliminates the need for physical reference to atmospheric pressure, simplifying installation and eliminating maintenance. The apparatus 100 may comprise a storage medium that is configured to store the data indicative of fluid level obtained by the first sensor 102 and/or the data indicative of fluid level obtained by the second sensor 106. In one example, the apparatus 100 is configured to calibrate the data indicative of fluid level obtained by the second sensor 106 using the data indicative of the last stored fluid value obtained by the first sensor 102 as the fluid level rises. In one example, the apparatus 100 is configured to use an algorithm to calibrate the data indicative of fluid level obtained by the second sensor 106 based on the data indicative of the fluid value obtained by the first sensor 102.

In one example, the apparatus 100 includes a housing 110. The housing 110 may be substantially elongate and substantially hollow so as to house electronic components within. The housing 110 is configured to substantially surround some of the electronic components of the apparatus 100, so as to protect the electronic components from the fluid. The first sensor 102 and the second sensor 106 may be coupled to the housing 110. At least part of the first sensor 102 may be located within the housing. At least part of the second sensor 106 may be located within the housing 110.

The housing 110 may be moulded from a resilient, naturally self-cleaning plastic polymer that is submersible.

The first sensor 102 may be located towards a lower region of the housing 110. In the example in which the first sensor 102 is an ultrasonic sensor, providing the ultrasonic sensor towards the lower region of the housing enables the ultrasonic sensor to point downwards such that the fluid level can be determined when it is below the bottom of the apparatus 100.

The second sensor 106 may be located between towards the lower region of the housing 110. In some examples, the second sensor 106 extends beyond the end of the housing 110 such that the second sensor 106 will begin obtaining data relating to the fluid level when the fluid level is below the bottom of the housing 110. In other words, the second threshold level 108, which may be level with the bottom extent of the second sensor 106 may be set below the bottom of the housing 110.

Figure 2:
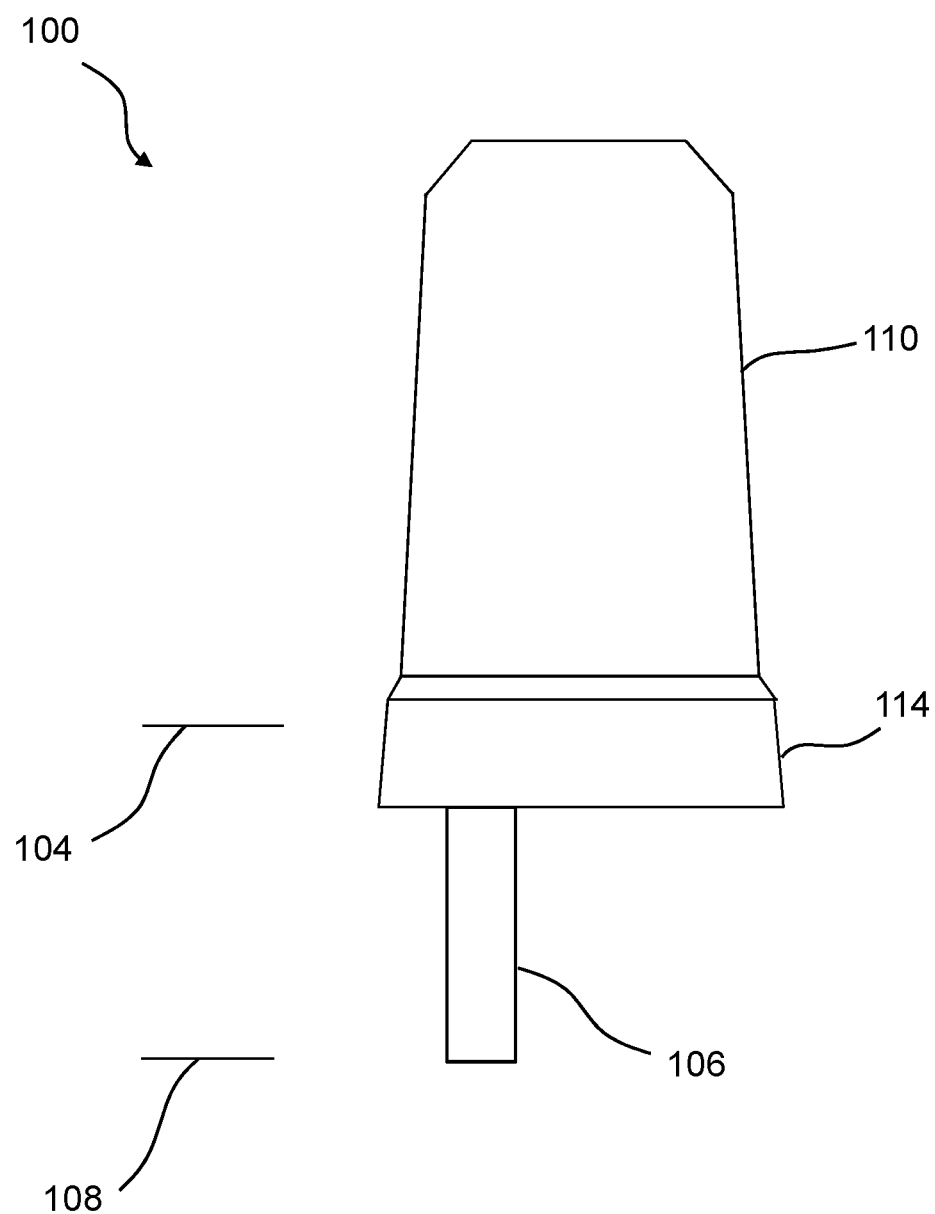
FIG. 2 shows an example of a front elevation of an open-channel flow monitoring apparatus with a skirt portion.

FIG. 2 shows a second example of the apparatus 100. In this example, the housing 110 comprises a skirt portion 114 that is configured to extend from the bottom of the housing 110. In this example, the first sensor 102 is substantially located within a recess defined by the skirt portion 114. As the fluid level rises from normal conditions to abnormal conditions, then the presence of the skirt portion 114 reduces the risk that the first sensor 102 will be submerged in the fluid and so will not require cleaning.

As can be seen in FIG. 2, the second sensor 106 may protrude below the extent of the skirt portion 114 such that the second threshold 108 is below the bottom of the skirt portion 114.

Figure 3:
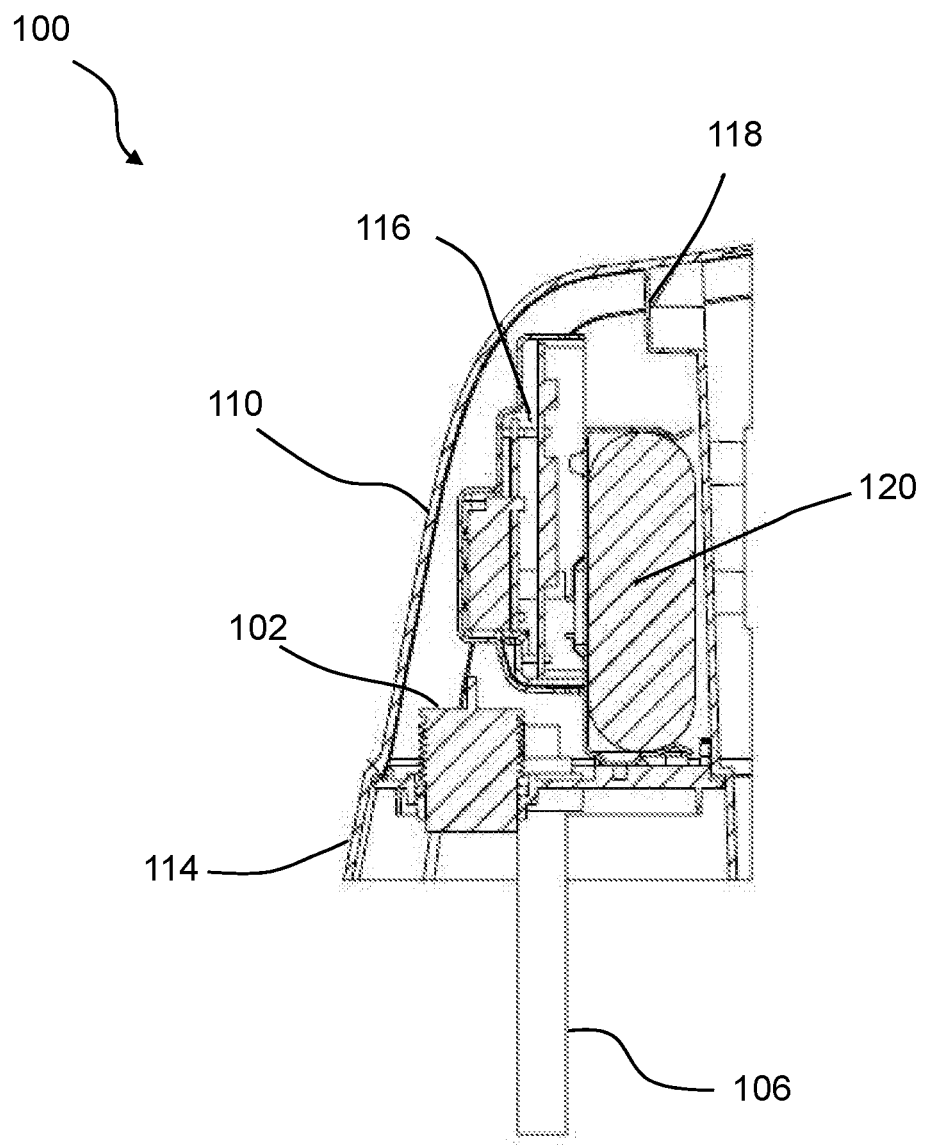
FIG. 3 shows an example of a cross-section of an open-channel flow monitoring apparatus.

FIG. 3 shows a cross sectional view through the apparatus 100. FIG. 3 shows that the housing 110 may be substantially hollow to define a cavity in which electronic components are located. In one example, the apparatus 100 includes one or more of a PCB well assembly 116, a cable entry point 118 and power source 120, such as a battery. In one example, the battery has an expected operating life of 5 years, in another example, the battery has an expected operating life of 10 years. The apparatus 100 in the example shown in FIG. 3 includes a connector 122 for an external antenna (not shown).

In one example, the apparatus 100 comprises a data logger for recording the data obtained by the first sensor 102 and the second sensor 106. The first sensor 102 and the second sensor 106 may be configured to output data indicative of the fluid level on a single data line. The obviates the requirement for there to be multiple data lines for each of the sensors.

In one example, the apparatus 100 includes a processor for processing the obtained data to determine the fluid level in situ. The apparatus 100 may also comprise a transmitter for transmitting the obtained data to an external receiver and processing of the data may occur at the external receiver.

In one example, the processor uses artificially intelligent decision-making systems which use learning algorithms to monitor and analyse fluid level data. It has become increasingly important to measure and deliver accurate, high quality, high resolution Level data during normal operating conditions—to enable the machine-learning processes to develop their understanding of normality. It also continues to be critically important to deliver high quality, reliable Depth data during exceptional operating conditions—for example, during high-levels caused by wet weather or blockages.

In one example, the apparatus 100 complies with the ATEX/IECEx Zone 0 Certification (DSEAR) and is configured to operate with any appropriately certified datalogger or telemetry outstation which can deliver its modest power requirements. the apparatus 100 may be configured to communicate with the datalogger using a number of serial data transfer protocols including Modbus.

In one example, the apparatus 100 includes a built-in Datalogger and transmitter, such as a NB-IoT modem (2G fall-back option) with a high-performance internal antenna. For marginal conditions where signal strength is really poor, there may be a connector for an optional external antenna. In this example, the apparatus complies with ATEX/IECEx Zone 0 Certification and is configured to fit into the "Manhole at the bottom of the garden".

The apparatus 100 has a range of simple mounting options suited to both flat-walled, (brick-built) chambers and the more modern 350 mm and 600 mm diameter prefabricated plastic chambers. It is ideal for shallow (350 mm minimum depth) manhole applications, can be configured for further cost-saving by using one or other of the Level or Depth sensors (rather than both).

The apparatus 100 is particularly suited for use in a sewer network for monitoring the sewage level. For example, the apparatus 100 may be used in wastewater sewer network monitoring applications. The apparatus 100 enables better operational management and pollution prevention objectives.

The apparatus 100 may also be used for monitoring domestic sewer manholes for blockages to help prevent internal sewer-flooding and localised pollution.

Further, the apparatus 100 may be used for river and other channel water course depth observation/environmental monitoring and early-warning flood prevention applications. For example, the apparatus 100 may be used in storm-water drainage network to monitor storm water levels.

Figure 4:
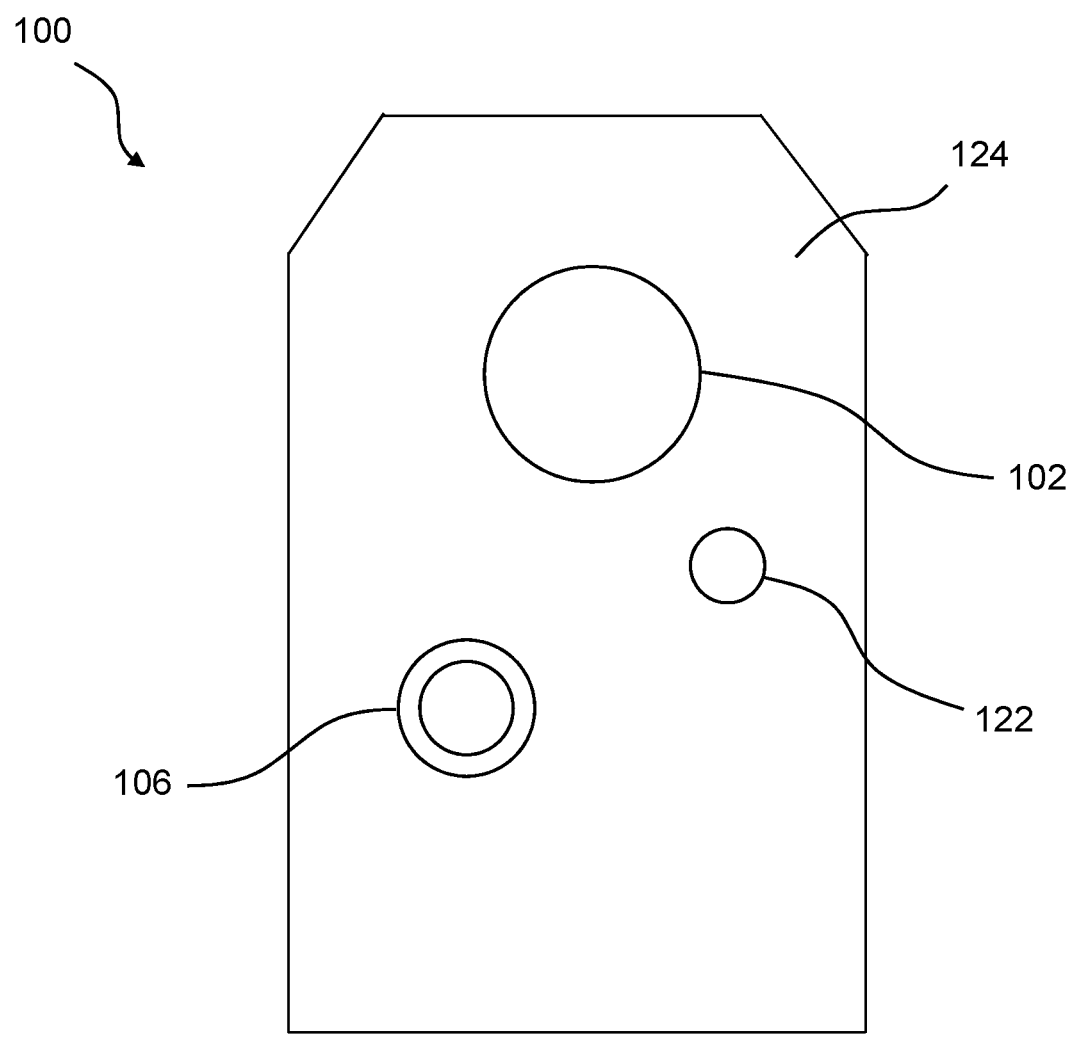
FIG. 4 shows an example of a bottom view of an open-channel flow monitoring apparatus.

FIG. 4 shows a view from the underside of the apparatus 100. The apparatus 100 may include a plate 124 that is located towards the bottom of the apparatus 100. In some examples, a skirt (not shown) extends beyond the plate 124. The first sensor 102 and the second sensor 106 may be coupled with the plate 124. Further, the apparatus 100 in the example shown in FIG. 4 includes a connector 122 for an external antenna (not shown).

Figure 5A:
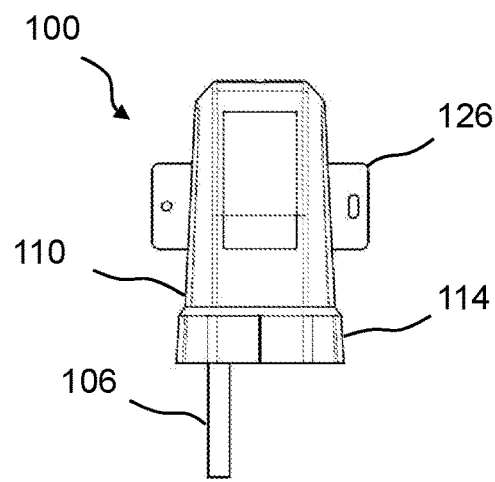
FIG. 5A shows an example of a front elevation of an open-channel flow monitoring apparatus.
Figure 5B:
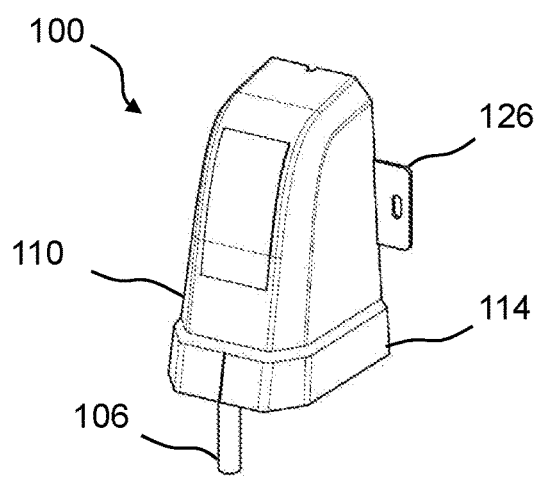
FIGS. 5B to 5D shows example of perspective views of an open-channel flow monitoring apparatus.
Figure 5C:
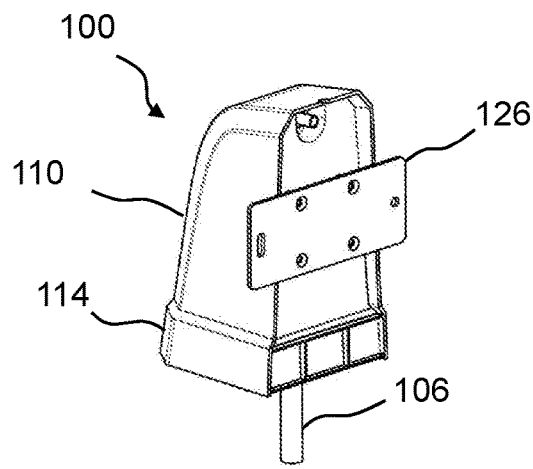
Figure 5D:
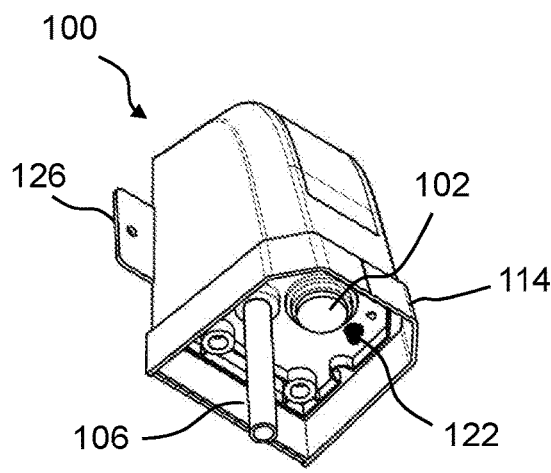

FIGS. 5A to 5D show various views of the apparatus. FIG. 5A shows a front elevation of the apparatus 100. In this example, the apparatus 100 includes a mount 126, such as a bracket for mounting the apparatus 100 to a wall of a chamber. The mounting 126 may be used to mount the apparatus to flat-walled brick-built chambers. The mounting 126 may also be used to mount the apparatus 100 to more modern circular chambers, for example chambers having a diameter of between 350 mm and 600 mm. The apparatus is ideal for use with shallow (350 mm minimum depth) manhole applications, FIGS. 5B to 5D show various perspective views of the apparatus 100.

Figure 6:
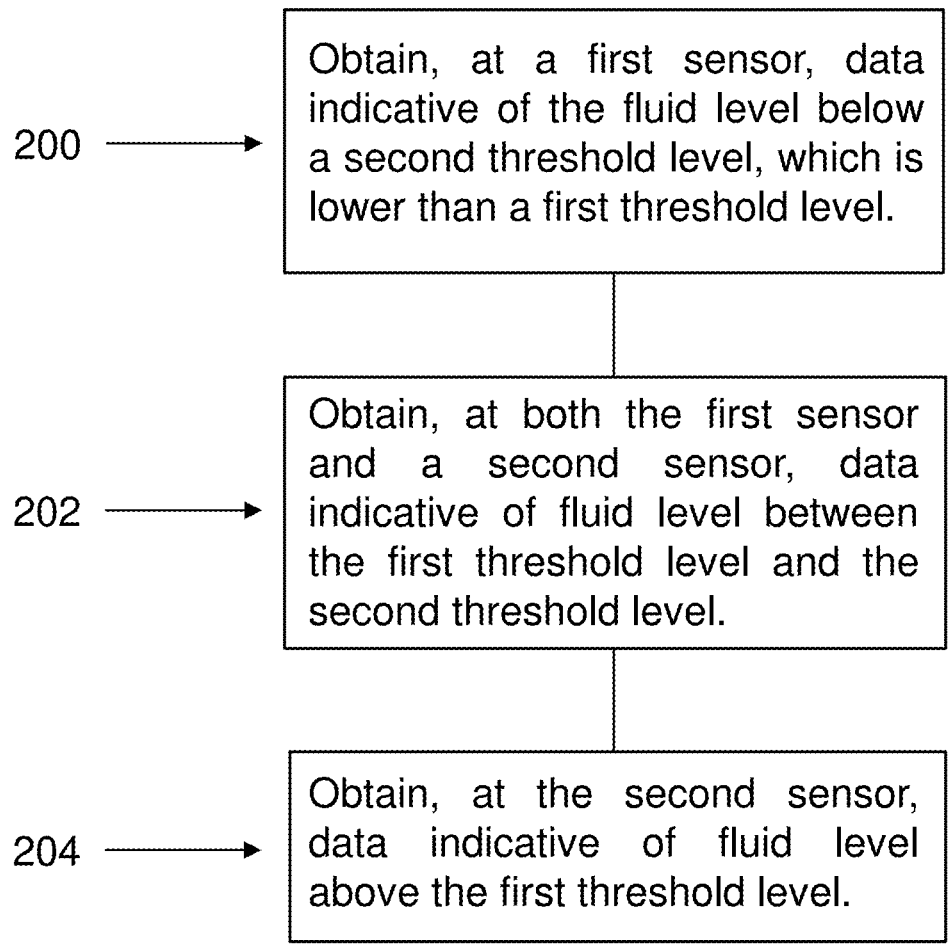
FIG. 6 shows an example of method steps of measuring a fluid level in an open-channel system.

FIG. 6 shows an example of the steps for measuring a fluid level in an open-channel system. At step 200 data indicative of the fluid level below a second threshold level 108, which is lower than a first threshold level, is obtaining at a first sensor 102. At step 202, data indicative of fluid level between the first threshold level 104 and the second threshold level 108 is obtained at both the first sensor 102 and a second sensor 106. At step 204, data indicative of fluid level above the first threshold level 104 is obtained at the second sensor 106.

The method may also include the step of calibrating the data indicative of the fluid level obtained by the second sensor 106 based on the data obtained by the first sensor 102 indicative of the fluid level.

According to one example, there is provided a computer-readable storage medium comprising instructions, which when executed by a computer, cause the computer to carry out the method of measuring a fluid level in an open-channel system identified above.

According to one example, there is provided a computer program product comprising instructions, which when the program is executed by a computer, cause the computer to carry out the method of measuring a fluid level in an open-channel system identified above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An open channel flow monitoring apparatus for measuring a fluid level, the apparatus comprising:
- a first noncontact sensor configured to obtain data indicative of a fluid level below a first threshold level;
- a second contact sensor configured to obtain data indicative of fluid level above a second threshold level, wherein the second threshold is lower than the first threshold level; and,
- a housing comprising a skirt portion configured to extend from the bottom of the housing, and defining a recess within the housing, wherein the first noncontact sensor is substantially located within a recess defined by the skirt portion, and wherein the second contact sensor extends below the skirt; wherein both the first noncontact sensor and the second contact sensor are configured to obtain data indicative of the fluid level when the fluid level is between the first threshold level and the second threshold,
- wherein the second contact sensor is configured to obtain data above the first threshold level, or
- wherein the first noncontact sensor is configured to obtain data below the second threshold level,
- wherein the first noncontact sensor and the second contact sensor are configured to output data indicative of the sewage level on a single cable, wherein the output data transitions seamlessly from data obtained from the first noncontact sensor to data obtained from the second contact sensor.

2. The open channel flow monitoring apparatus according to claim 1, wherein the apparatus is configured to calibrate the data indicative of fluid level obtained by the second sensor based on the data obtained by the first sensor indicative of the fluid level.

3. The open channel flow monitoring apparatus according to claim 2, wherein the apparatus is configured to calibrate the data indicative of fluid level obtained by the second sensor using the data indicative of the last stored fluid value obtained by the first sensor as the fluid level rises above the second threshold.

4. The open channel flow monitoring apparatus according to claim 1, wherein the first sensor comprises an ultrasonic sensor.

5. The open channel flow monitoring apparatus according to claim 1, wherein the second sensor comprises a pressure sensor.

6. The open channel flow monitoring apparatus according to claim 5, wherein the pressure sensor comprises a pressure probe configured to project to the second threshold level.

7. The open channel flow monitoring apparatus according to claim 1, the apparatus comprising a temperature sensor.

8. The open channel flow monitoring apparatus according to claim 1, further comprising a data logger configured to log the obtained data indicative of the fluid level.

9. The open channel flow monitoring apparatus according to claim 1, further comprising a transmitter configured to transmit the obtained data indicative of the fluid level.

10. The open channel flow monitoring apparatus according to claim 1, wherein the open channel flow is a sewer or a storm drain and the fluid level is a sewage or storm water level.

11. A method of measuring a fluid level in an open-channel system using the apparatus of claim 1, the method comprising:
- obtaining, at a first sensor, data indicative of the fluid level below a second threshold level, which is lower than a first threshold level;
- obtaining, at both the first sensor and a second sensor, data indicative of fluid level between the first threshold level and the second threshold level; and
- obtaining, at the second sensor, data indicative of fluid level above the first threshold level.

12. The method of claim 11, comprising:
- calibrating the data indicative of the fluid level obtained by the second sensor based on the data obtained by the first sensor indicative of the fluid level.

13. A computer-readable storage medium comprising instructions, which when executed by a computer, cause the computer to carry out the method of claim 11.

* * * * *